United States Patent
Toennesland et al.

(10) Patent No.: US 6,575,052 B2
(45) Date of Patent: Jun. 10, 2003

(54) PEDAL MECHANISM FOR OPERATING BRAKE AND DIRECTIONAL LOCK ON LEVER-OPERATED CASTER WHEELS

(75) Inventors: Aasulv Toennesland, Hornnes (NO); Louis Morasse, Bromont (CA); Robert A. Meurer, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/919,161

(22) Filed: Jul. 31, 2001

(65) Prior Publication Data
US 2003/0024340 A1 Feb. 6, 2003

(51) Int. Cl.$^7$ ............................. G05G 1/14; A47B 71/00
(52) U.S. Cl. ............................. 74/512; 74/560; 74/562; 74/562.5; 5/600; 16/35 R
(58) Field of Search ............... 74/512, 513, 560–562.5; 5/610, 86.1, 600, 601, 611, 614; 280/43.17, 98, 264.1; 16/35 R, 35 D

(56) References Cited
U.S. PATENT DOCUMENTS 4,276,962 A * 7/1981 Aulik ........................ 188/1 D
4,489,449 A * 12/1984 Failor et al. ..................... 5/86
RE34,433 E * 11/1993 Heiligenthal et al. ....... 16/35 R
5,377,372 A * 1/1995 Rudolf et al. ................. 5/600
6,286,165 B1 * 9/2001 Heimbrock et al. ........... 5/600
6,421,854 B1 * 7/2002 Heimbrock ................... 5/610

FOREIGN PATENT DOCUMENTS

CH  570802  * 12/1975  .................... 5/86.1
JP  11-321208  * 11/1999  ................. 16/35 R

* cited by examiner

*Primary Examiner*—Vinh T. Luong
(74) *Attorney, Agent, or Firm*—Ostrager Chong & Flaherty LLP

(57) ABSTRACT

A scanner or other system has an actuator, a mechanical device having three states corresponding to three respective positions of the actuator, and a pedal mechanism. The pedal mechanism comprises: a support structure; first and second slotted arms pivotably mounted to the support structure; first and second latches respectively pivotably mounted to the first and second arms; a pivot part pivotably mounted to the support structure; and a mechanism for converting pivoting of the pivot part into movement of the actuator, e.g., swinging of a lever. The pivot part has first and second extensions which extend in generally opposite directions and which respectively protrude through the slots in the first and second arms. The pedal arms, latches and pivot part cooperate to enable the position of the actuator to be controlled by depressing one pedal at a time.

20 Claims, 5 Drawing Sheets

PEDAL MECHANISM FOR OPERATING BRAKE AND DIRECTIONAL LOCK ON LEVER-OPERATED CASTER WHEELS

BACKGROUND OF THE INVENTION

This invention generally relates to portable battery-powered electronic devices. In particular, the invention relates to such battery-powered equipment used to monitor patients during transport in a hospital or other patient care setting.

Pedal mechanisms for operating the brake and directional wheel lock of standard lever-operated caster wheels, such as those installed on ultrasound systems, have traditionally been cumbersome to operate, requiring that the pedal(s) be pressed from awkward angles. They have also often required the pedal to be lifted by the toe to get back into its original position. This has caused complaints from many operators and especially females using open sandal-like footwear. In addition, in earlier solutions it has been difficult to visually determine which of three positions—namely, directionally locked, free swivel or braked—the pedal is in. There have also been complaints about the user interface and that operation of the mechanisms is not very intuitive.

There is a need for the mechanical design of a cost-effective push—push pedal mechanism for converting the vertical motion of two different pedals to the horizontal activation of the lever of a conventional caster wheel assembly, which design is such that the position of the pedals indicates which of three possible states the pedal mechanism is in.

SUMMARY OF THE INVENTION

The present invention is directed to an improved pedal mechanism for operating the brake and directional wheel lock of standard lever-operated caster wheels or other actuatable mechanical devices. Although the invention is disclosed in the context of an ultrasound scanner, the invention has application to other scanners and even other types of equipment having an actuatable mechanical device suited for control via pedal operation. Nor is the pedal mechanism of the invention limited in its application to mechanical devices that are actuated by means of a lever.

In accordance with the preferred embodiment disclosed herein, a scanner or other system has an actuator, a mechanical device having three states corresponding to three respective positions of the actuator, and a pedal mechanism. The pedal mechanism comprises: a support structure; first and second slotted arms pivotably mounted to the support structure; first and second latches respectively pivotably mounted to the first and second arms; a pivot part pivotably mounted to the support structure; and a mechanism for converting pivoting of the pivot part into movement of the actuator, e.g., swinging of a lever. The pivot part has first and second extensions which extend in generally opposite directions and which respectively protrude through the slots in the first and second arms. The pedal arms, latches and pivot part cooperate to enable the position of the actuator to be controlled by depressing one pedal at a time. In particular, the pedal mechanism comprises first and second pedals and is designed to control the position of the actuator in response to depressions of the pedals in accordance with the following sequence: (1) the actuator is moved from a second position to a first position in response to depression of the first pedal while the actuator is in the second position; the actuator is moved from the first position to the second position in response to depression of the second pedal while the actuator is in the first position; the actuator is moved from the second position to the third position in response to depression of the second pedal while the actuator is in the second position; and the actuator is moved from the third position to the second position in response to depression of the first pedal while the actuator is in the third position.

The pedal mechanism disclosed herein offers an easy-to-use user interface, supplying a clear visual information concerning which of the three positions the mechanism and casters are in. It allows for an ergonomically good operation with the line of force close to vertical and without the need for any pedals to be lifted by the system operator using his/her toe. The pedals are easily accessible and there is little risk of putting the mechanism in an unwanted position.

The pedal mechanism itself can be manufactured from cheap materials and components. Manufacture involves some sheet bending, typically in semi-automated machines, but for series production these costs too will be low. The design in accordance with the preferred embodiment allows for generous manufacturing tolerances and requires few welds, so that little heat distortion occurs. The cost of manufacture will be competitive with simpler conventional pedal mechanisms which offer less functionality and fewer features than does the invention. The pedal mechanism disclosed herein is also compact and with a form factor and design to avoid the risk of the operator's toe kicking into the mechanism while transporting the system.

Other aspects of the invention are disclosed and claimed below.

DETAILED DESCRIPTION OF THE PREFERRED EMBODIMENTS

Figure 1:
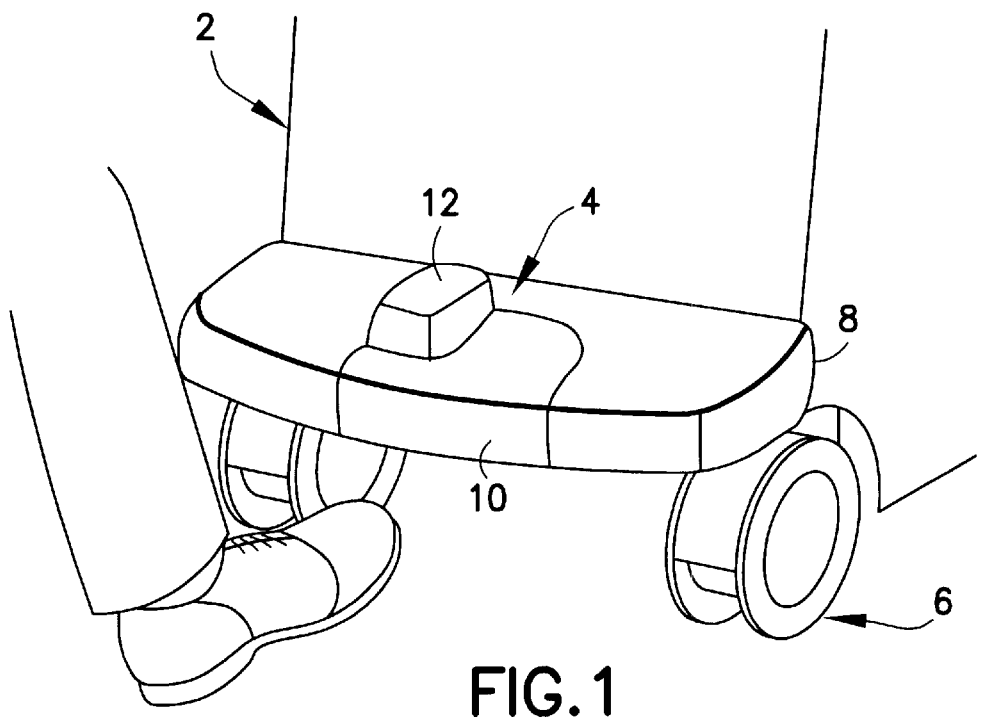
FIG. 1 is a drawing showing part of an ultrasound scanner which incorporates a pedal mechanism in accordance with the preferred embodiment of the invention.

In the case of an ultrasound scanner 2, the pedal mechanism 4 is preferably positioned between the caster wheels 6 in the front footrest 8 found on most ultrasound scanners, as illustrated in FIG. 1. The pedal mechanism comprises a brake pedal 10 and a directional lock pedal 12. In the preferred embodiment of the invention, the brake pedal 10 is wider than the directional lock pedal 12. Both pedals are displaceable in the vertical or elevational direction during pedal actuation.

Figure 2:
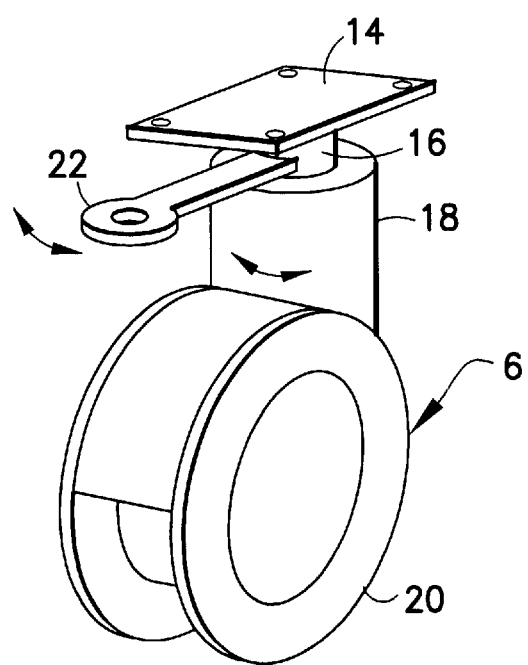
FIG. 2 is a drawing showing a conventional lever-operated caster wheel assembly.

The pedal mechanism 4 is coupled to a pair of standard lever-operated caster wheels 6 of the type shown in FIG. 2. Each caster wheel is an assembly comprising: a mounting plate 14 by means of which the caster wheel is bolted or otherwise attached to the bottom of the equipment; a post 16 rigidly connected to the mounting plate 14 and extending perpendicular thereto; a wheel support structure 18 pivotably mounted on the post 16 and comprising a horizontal shaft disposed perpendicular to the post 16; a wheel 20 rotatably mounted on the horizontal shaft of the wheel support structure 18; and a lever 22 which is pivotable in a horizontal plane about one end through an arc of, e.g., ±30°.

These casters have a braking function and a directional locking function in addition to the free swiveling mode. The lever has three angular positions located respectively at +30°, 0° and −30° and corresponding to the braked state, the free swivel state and the directionally locked state respectively. When the lever is in the center position, the wheels turn freely and the caster can swivel around its vertical axis. During its swing from 0° to +30°, the lever 22 actuates a braking mechanism (not shown) that brakes the wheel 20 against rotation about the horizontal shaft; during its swing from 0° to −30°, the lever 22 actuates a locking mechanism (not shown) which locks the wheel support structure 18 and prevents it from turning about the vertical axis.

Figure 3:
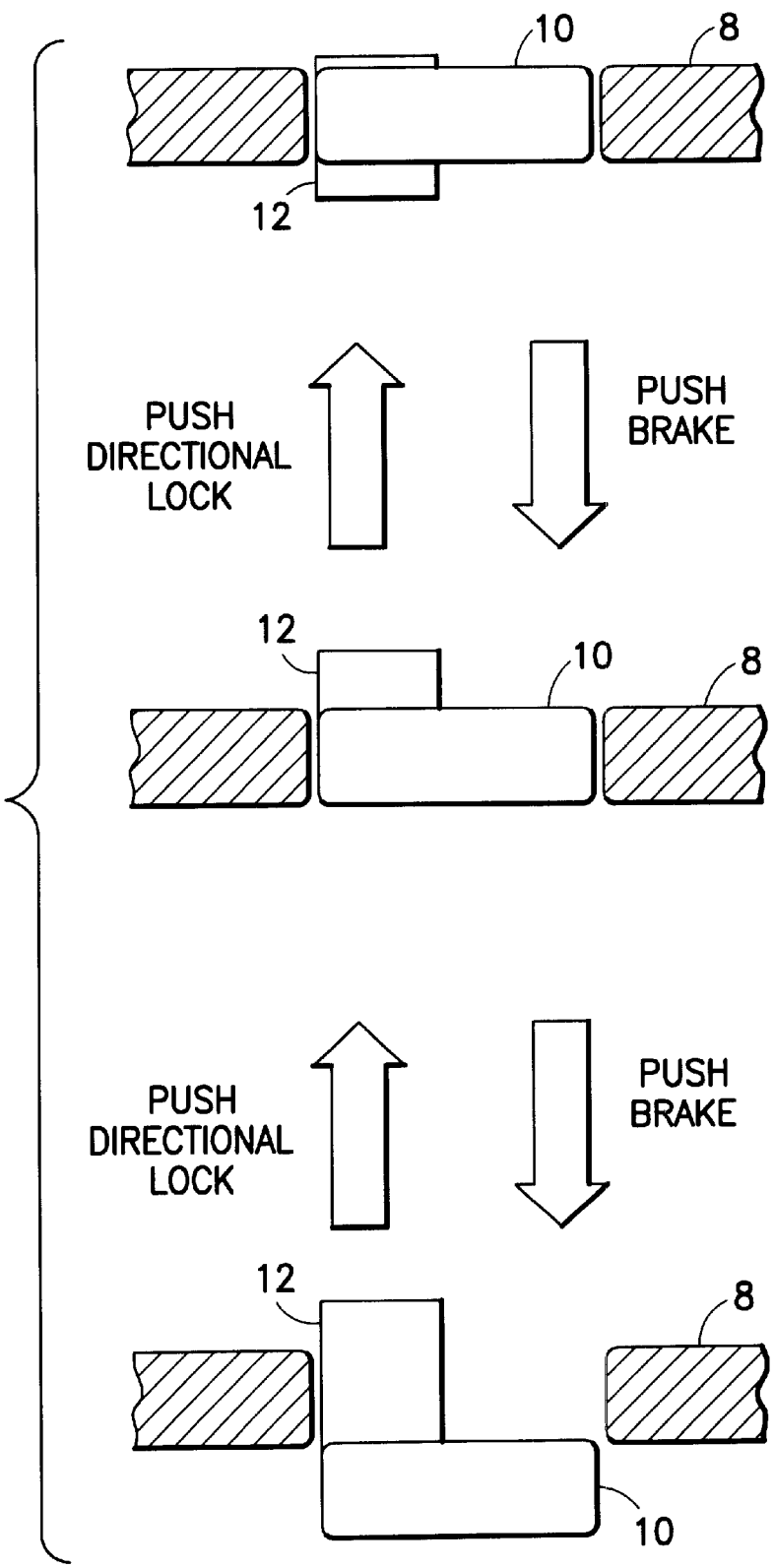
FIG. 3 is a drawing depicting three states of the pedal mechanism in accordance with the preferred embodiment of the invention: top frame—the directionally locked state; middle frame—the free swivel state; bottom frame—the braked state. The arrows indicate state transitions and the associated labels indicate which pedal is pushed in order to actuate the respective transition.

In accordance with the preferred embodiment of the invention, the pedals 10, 12 only need to be pushed during operation, not lifted, although the mechanism will work if the pedals are lifted. The different positions of the pedals are shown in FIG. 3 with the normal (free swivel) position shown in the middle. In the free swivel state, the brake pedal 10 is generally level with the footrest 8, while the directional lock pedal 12 projects upward, above the plane of the upper surface of the brake pedal. As seen in the top frame of FIG. 3, the directional lock is actuated by pushing the directional lock pedal 12 downward relative to the stationary brake pedal 10. To return to the free swivel state from the directionally locked, the operator must push on the brake pedal until the directional lock pedal is released and returned to its original position by a return spring. As seen in the bottom frame of FIG. 3, the brake is actuated by pushing the brake pedal 10 downward relative to the stationary directional lock pedal 10. To return to the free swivel state from the braked state, the operator must push on the directional lock pedal until the brake pedal is released and returned to its original position by a return spring.

A great advantage of the user interface shown in FIG. 3 is that one pedal needs to be pushed to activate the brake and another to activate the direction lock, no matter which of the modes the mechanism is in. Depending on whether you have to "pass through" the free swivel position, the selected pedal needs to be pushed once or twice. The positions of the pedals always tell which of the three modes the pedal mechanism is in. To enter the free swivel mode, only one pedal is "pushable" in either of the two other modes. The large and easily accessible brake pedal also makes emergency braking easier. This may be desirable when moving a heavy scanner down ramps etc.

Figure 4:
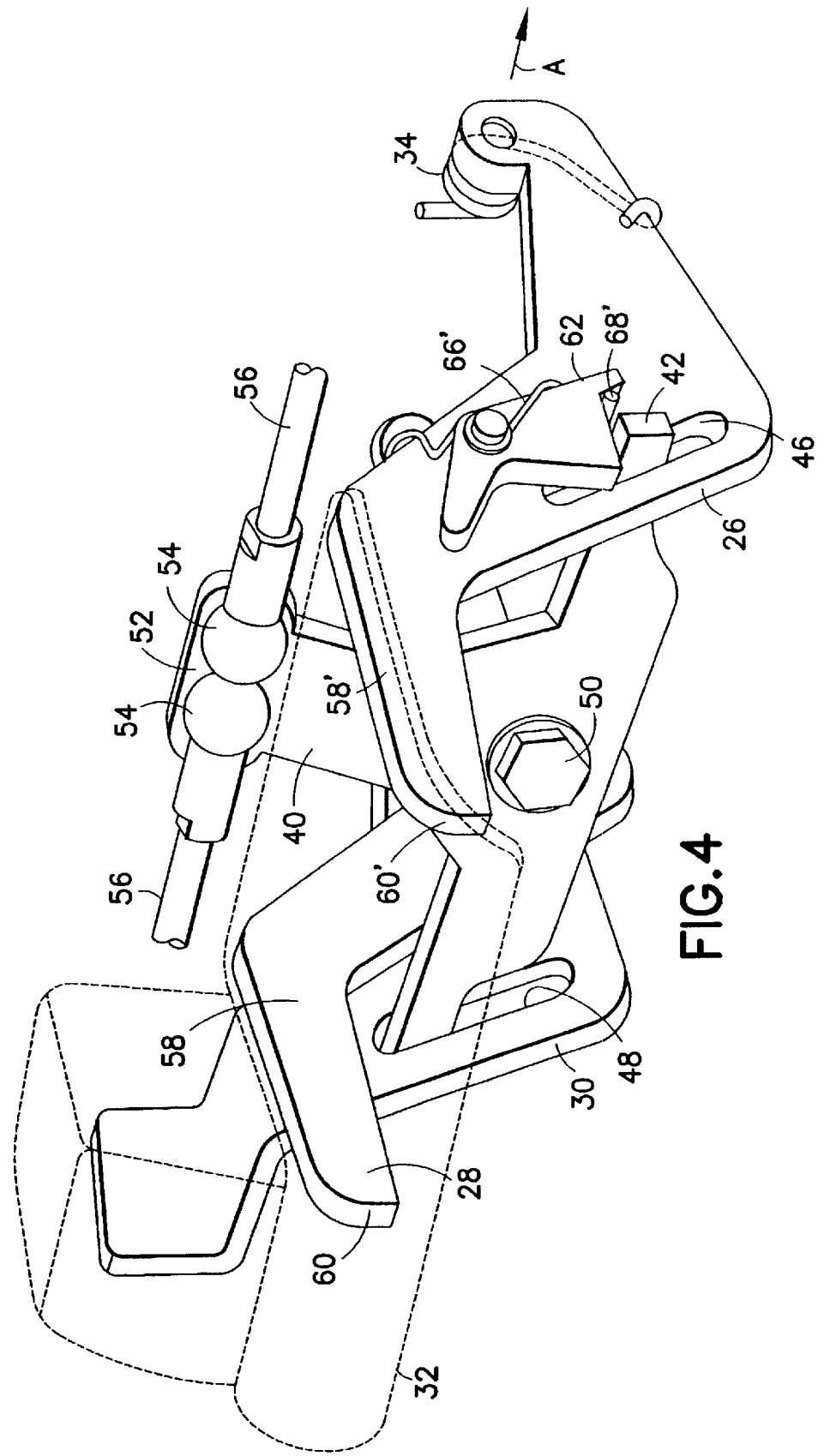
FIGS. 4 and 5 are drawings showing two views of the principal components of the pedal mechanism in accordance with the preferred embodiment of the invention. The mechanism is shown in the braked state.
Figure 5:
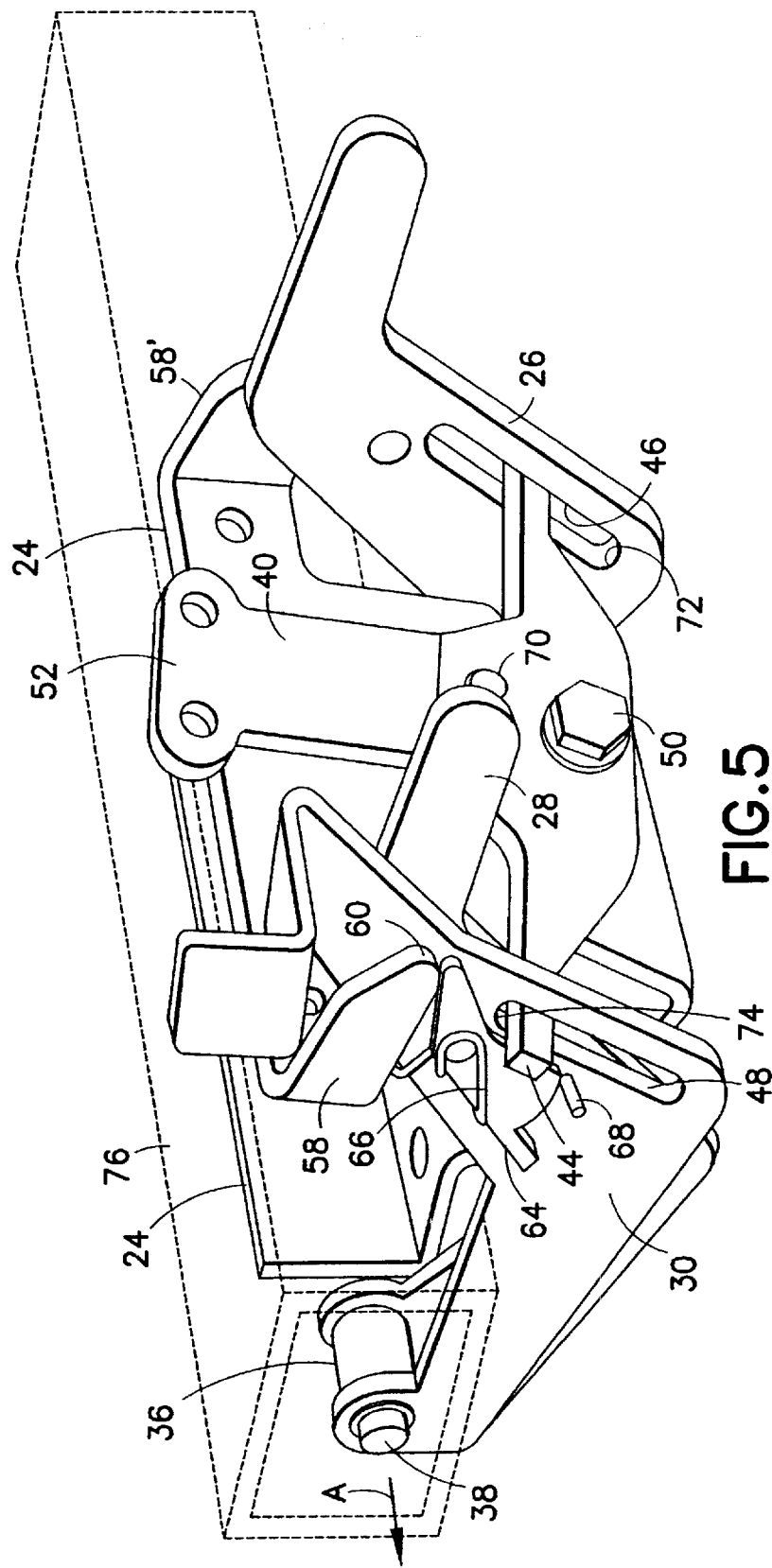

The pedal mechanism in accordance with the preferred embodiment of the invention is made out of cut and bent steel sheet metal assembled with a few welds, a few rivet bolts and a few screws. FIGS. 4 and 5 shows the design in accordance with the preferred embodiment. A mounting bracket holding everything together and mounting the pedal mechanism to the system frame is not shown in FIG. 4 for clarity, but is designated by numeral 24 in FIG. 5.

In accordance with the preferred embodiment of the invention, the pedal mechanism converts up-down or elevational motion of the pedals into sideways or lateral motion of the levers operating the caster internal brake and directional lock mechanisms. The brake pedal (10 in FIGS. 1 and 3) comprises a pair of arms 26 and 28, while the directional lock pedal (12 in FIGS. 1 and 3) comprises a single arm 30. The brake pedal arms 26 and 28 are connected by a plate 32, the entire assembly moving in unison when the brake pedal is pushed. Arm 28 serves to stiffen the brake pedal, which is relatively wide. The plate 32 also serves as a support plate for the polymer pedal cover (visible in FIG. 1) which forms the top surface of the brake pedal. The directional lock pedal needs only one arm 30 because the pedal 12 itself (indicated by dashed lines in FIG. 4) is much narrower than the brake pedal and because it requires less force for activation. All three arms are hinged around the same axis A and lifted up by coiled springs 34 around this axis. One of the coiled springs is visible in FIG. 4. To improve stability of the directional lock arm 30, a tube 36 is attached and fine tolerance neck screws 38 are used, as seen in FIG. 5.

Referring to FIG. 4, the pedal mechanism further comprises a T-shaped pivot part 40 having opposing collinear extensions 42 and 44 which pass through and interact with respective narrow, near vertical slots 46 and 48 formed in arms 26 and 30 respectively. The T-shaped pivot part 40 is pivotably mounted to the mounting bracket 24 by means of a bolt 50 and comprises a central member 52 which extends upwardly from the pivot area and generally perpendicular to the pivot part extensions 42 and 44. The central member 52 of the pivot part 40 is coupled to the levers of opposing caster wheel assembles (not shown in FIG. 4) by means of respective ball joints 54 and respective rods 56, one end of each rod being connected to the ball joint and the other end being pivotably coupled to the distal end of a respective caster wheel lever (see FIG. 2). From a central, i.e., vertical position of the central member (representing the free swivel state), shown in FIG. 6, the T-shaped pivot part 40 can pivot in either direction. Pivoting of the pivot part 40 in one direction causes both caster wheel assemblies to be levered into the directionally locked state; pivoting of the pivot part 40 in an opposite direction causes both caster wheel assemblies to be levered into the braked state. The operator actuates the former condition by pushing down the directional lock pedal and the latter condition by pushing down the brake pedal.

Figure 6:
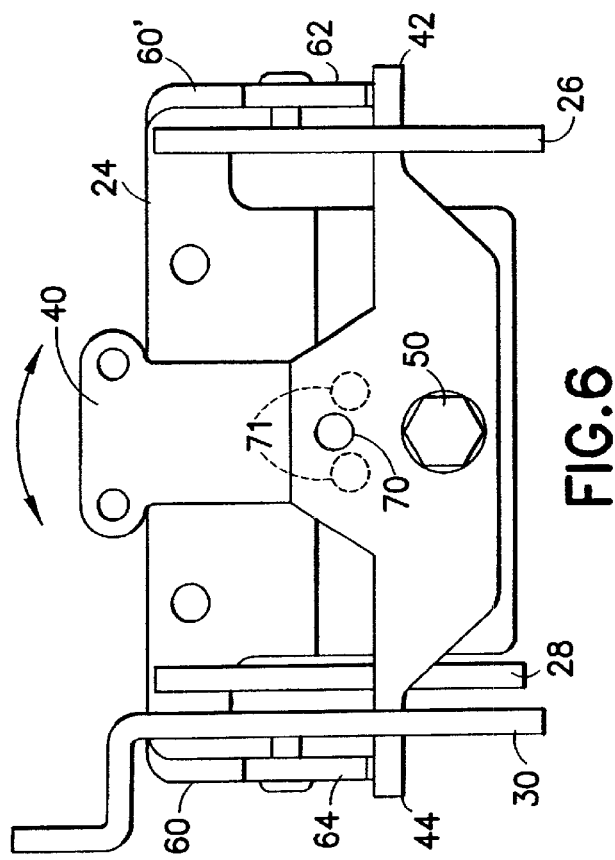
FIG. 6 is a drawing showing a front view of the pedal mechanism in accordance with the preferred embodiment of the invention. The mechanism is shown in the free swivel state.

The operation of the pedal mechanism in accordance with the preferred embodiment of the invention will now be described in more detail. The mounting bracket 24 comprises a pair of members 58, each member 58 having a tip 60. When the pedal mechanism is in the free swiveling position as shown in FIG. 6, the tips 60 of the mounting bracket 24 engage and press down on the tips of respective latches 62 (see FIG. 4) and 64 (see FIG. 5). The latch 62 is pivotably mounted to the brake pedal arm 26; the latch 64 is pivotably mounted to the directional lock arm 28. The engagement of tip 60' with the tip of latch 62 can be seen in FIG. 7. In this position, the latch 62 is held clear of extension 42, allowing extension 42 to travel freely in slot 46 as the T-shaped pivot part 40 is pivoted. Likewise, the tip 60 holds the latch 64 clear of extension 44, allowing extension 44 to travel freely in slot 48 as the T-shaped pivot part 40 is pivoted. When either latch is no longer held in check by engagement with one of the tips 60, 60' of the mounting bracket 24, that latch is urged to cover the respective slot (46 or 48) by a respective spring 66 or 66'. In the case of latch 62, the latch is pivoted from the position shown in FIG. 7 to the position shown in FIG. 4 when the brake pedal is depressed slightly. This lowers the latch 62 to a position where it is clear of the tip 60' (shown in FIG. 7) and is free to pivot under urging of the spring 66'.

Figure 7:
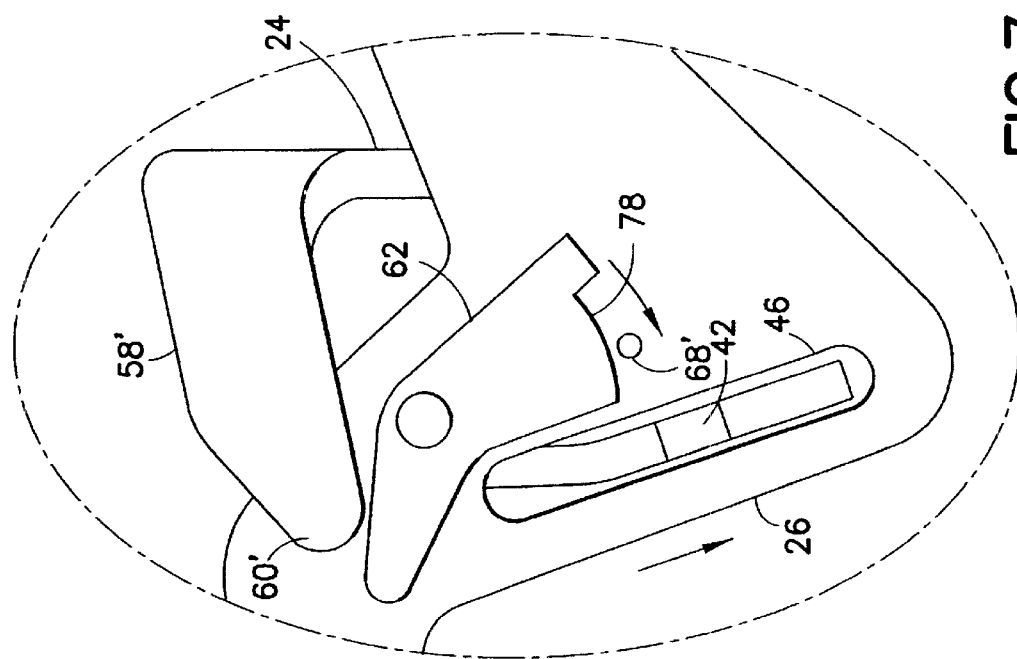
FIG. 7 is a drawing showing a side view of a portion of the pedal mechanism depicted in FIG. 6.

Thus, in the free swivel position shown in FIGS. 6 and 7, the narrow, near vertical slots 46 and 48 in the arms 26 and 30 will not be covered. This is necessary because the T-shaped pivot part 40 must be able to rotate both ways from this position.

When one of the pedals is pushed from the free swiveling position, the associated latch (62 or 64) will rotate to a position overlying the corresponding slot and will engage a corresponding arm (42 or 44) of the T-shaped pivot part 40. For example, referring to FIG. 4, when the brake pedal 10 is pushed, the spring 66' will, after a short pedal travel, rotate the latch 62 until it hits the pin 68'. In the fully rotated position, the arcuate surface 78 of the latch 62 engages the extension 42 of the T-shaped pivot part 40 during further downward travel of the brake pedal. Once the latch 62 and extension 42 are engaged, further downward travel of the brake pedal causes the T-shaped pivot part 40 to rotate to the position shown in FIGS. 4 and 5, which in turn actuates the levers of the caster wheel assembles to apply the internal brakes in the manner previously described.

On the left side (best seen in FIG. 5), the pivot part extension 44 will have traveled upward and past the latch 44 during the aforementioned rotation of the pivot part. The pivot part 40 carries a conventional spring-loaded indexing ball 70 which interacts with a series of three concave recesses 71 (two of which are indicated by dashed circles in FIG. 6, while the indexing ball 70 is sitting in the third recess) formed in the front surface of the mounting bracket 24 and having centers lying along an arc centered at the pivot axis of the T-shaped pivot part 40. The radius of the arc is equal to the distance from the center of the indexing ball to the pivot axis of the T-shaped pivot part 40. The pivot axis of the pivot part 40 is generally perpendicular to the axis A, i.e., the collinear pivot axes of arms 26, 28 and 30. As the pivot part 40 pivots, the indexing ball travels with the pivot part. When the indexing ball 70 overlies one of the concave recesses, a spring urges the indexing ball into the recess. The indexing ball is seated in a respective recess for each of the three positions: directional lock, free swivel and braked. When the indexing ball is seated in one of the recesses, the resistance provided by the spring-loaded indexing ball has to be great enough to resist the spring force urging the pedal upwards. When released, the brake pedal will rise slightly until the bottom end surface 72 of the slot 46 engages the bottom of the pivot part extension 42. Due to the engagement of the indexing ball in the concave recess corresponding to the braked position, the brake pedal will be held in a depressed position by the surface 72 that bears against the underside of the extension 42 of the T-shaped pivot part 40. In practice, the spring-loaded indexing ball may be replaced by a spring-loaded cam roller for greater indexing force and reliability.

To restore the depressed brake pedal to the upright position, preferably the directional lock pedal is pushed down. During downward movement of the directional lock pedal, the top end surface 74 of slot 48 bears against the topside of the pivot part extension 44. The directional lock pedal is pushed downward until the T-shaped pivot part 40 reaches the free swivel position. In the free swivel position, the latch 62 will be pressed against the tip 60' of the mounting bracket 24, causing the latch 62 to swing back to a retracted position where it no longer partially covers slot 46. When the directional lock pedal is thereafter released by the operator, a coiled spring lifts the pedal upward. When the arcuate bottom surface of the latch 64 is higher than the top of the extension 44, the spring 66 urges latch 44 to a position covering slot 48, but further upward movement of the directional lock pedal brings the tip of latch 64 into engagement with tip 60 of the mounting bracket, causing the latch 64 to swing back to a retracted position.

The mechanical operations involved in actuation and release of the directional lock pedal are analogous to those disclosed above with regard to the brake pedal. The directional lock state is actuated by pushing the directional lock pedal down. To restore the depressed directional lock pedal to the upright position, preferably the brake pedal is pushed down until the T-shaped pivot part reaches the free swivel position.

The whole pedal mechanism in accordance with the preferred embodiment is mounted via the mounting bracket 24 to a frame beam 76, shown in FIG. 5. The pedal rotational axis A is pulled up behind this beam in order to have the pedals move as close to vertical as possible plus minimizing the gliding motion between the different contact surfaces engaging the T-shaped pivot part 40.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A system comprising an actuator, a mechanical device having first, second and third states corresponding to first, second and third positions respectively of said actuator, and a pedal mechanism arranged to provide an operator interface for controlling the position of said actuator, wherein said pedal mechanism comprises first and second pedals and is designed to control the position of said actuator in response to depressions of said first and second pedals in accordance with the following sequence:

said actuator is moved from said second position to said first position in response to depression of said first pedal while said actuator is in said second position;

said actuator is moved from said first position to said second position in response to depression of said second pedal while said actuator is in said first position;

said actuator is moved from said second position to said third position in response to depression of said second pedal while said actuator is in said second position; and said actuator is moved from said third position to said second position in response to depression of said first pedal while said actuator is in said third position.

2. The system as recited in claim 1, further comprising a support structure, wherein said first pedal comprises a first arm pivotably mounted to said support structure, said first arm comprising a first slot, said second pedal comprises a second arm pivotably mounted to said support structure, said second arm comprising a second slot, and said pedal mechanism further comprises:

a support structure;

a pivot part pivotably mounted to said support structure, said pivot part comprising first and second portions extending in generally opposite directions and projecting respectively through said first and second slots;

a mechanism which converts rotation of said pivot part into rotation of said actuator;

a first latch pivotably mounted to said first pedal arm and having a first angular position in which said first latch overlies part of said first slot and a second angular position in which said first latch does not overlie part of said first slot; and a second latch pivotably mounted to said second pedal arm and having a first angular position in which said second latch overlies part of said second slot and a second angular position in which said second latch does not overlie part of said second slot, wherein said first and second portions of said pivot part are movable relative to and along said first and second slots respectively, said first latch blocks said first portion of said pivot part from further upward travel in said first slot when said first latch is in said first angular position, and said second latch blocks said second portion of said pivot part from further upward travel in said second slot when said second latch is in said first angular position.

3. The system as recited in claim 2, further comprising a spring-loaded rolling element coupled to said pivot part and a plurality of recesses formed in said support structure along an arc, said rolling element being seatable in any one of said recesses during pivoting of said pivot part relative to said support structure.

4. The system as recited in claim 2, further comprising a third pedal arm pivotably mounted to said support structure, said first and third pedal arms being coupled so that they pivot in unison.

5. The system as recited in claim 2, wherein said support structure comprises first and second tip portions which respectively engage said first and second latches and hold said first and second latches in said second angular positions when said first and second pedals are not depressed.

6. The system as recited in claim 2, further comprising first and second springs which respectively urge said first and second pedals toward an undepressed position, and third and fourth springs which respectively urge said first and second latches from said second angular position toward said first angular position.

7. The system as recited in claim 6, further comprising first and second pins which respectively stop said first and second latches at said first angular position.

8. The system as recited in claim 2, further comprising a ball joint and a rod for coupling said pivot part to said actuator.

9. The system as recited in claim 2, wherein said actuator comprises a lever and said mechanical device comprises a caster wheel assembly having a braked state, a free swivel state and a directionally locked state respectively corresponding to said first, second and third positions of said lever.

10. The system as recited in claim 9, further comprising a scanner, wherein said caster wheel assembly is pivotably mounted and said support structure is fixedly mounted to said scanner.

11. A system comprising an actuator, a mechanical device having first, second and third states corresponding to first, second and third respective positions of said actuator, and a pedal mechanism arranged to provide an operator interface for controlling the position of said actuator, wherein said pedal mechanism comprises:

a support structure;

first and second arms pivotably mounted to said support structure and having first and second slots respectively formed therein;

first and second latches respectively pivotably mounted to said first and second arms;

a pivot part pivotably mounted to said support structure; and a mechanism for converting pivoting of said pivot part into movement of said actuator, wherein said pivot part comprises first and second extensions which extend in generally opposite directions and which respectively protrude through said first and second slots, and said pivot part has first, second and third angular positions corresponding to said first, second and third states respectively.

12. The system as recited in claim 11, wherein said first latch has a first angular position in which said first latch overlies part of said first slot and a second angular position in which said first latch does not overlie part of said first slot, said second latch has a first angular position in which said second latch overlies part of said second slot and a second angular position in which said second latch does not overlie part of said second slot, and said first and second extensions are movable relative to and along said first and second slots respectively, said first latch blocking said first extension from further upward travel in said first slot when said first latch is in said first angular position, and said second latch blocking said second extension from further upward travel in said second slot when said second latch is in said first angular position.

13. The system as recited in claim 11, further comprising a spring-loaded rolling element coupled to said pivot part and a plurality of recesses formed in said support structure along an arc, said rolling element being seatable in any one of said recesses during pivoting of said pivot part relative to said support structure.

14. The system as recited in claim 11, further comprising a third arm pivotably mounted to said support structure, and a member for coupling said first and third arms so that said first and second arms pivot in unison.

15. The system as recited in claim 11, wherein said support structure comprises first and second tip portions which respectively engage said first and second latches and hold said first and second latches in said second angular positions when said first and second arms are not depressed.

16. The system as recited in claim 11, further comprising first and second springs which respectively urge said first and second arms toward an undepressed position, and third and fourth springs which respectively urge said first and second latches from said second angular position toward said first angular position.

17. The system as recited in claim 16, further comprising first and second pins which respectively stop said first and second latches at said first angular position.

18. The system as recited in claim 11, further comprising a ball joint and a rod for coupling said pivot part to said actuator.

19. The system as recited in claim 11, wherein said actuator comprises a lever and said mechanical device comprises a caster wheel assembly.

20. The system as recited in claim 19, further comprising a scanner, wherein said caster wheel assembly is pivotably mounted and said support structure is fixedly mounted to said scanner.

* * * * *